United States Patent [19]
Yakubovich

[11] Patent Number: 6,028,621
[45] Date of Patent: Feb. 22, 2000

[54] METHOD OF FORMING AND REPRODUCING A THREE-DIMENSIONAL IMAGE AND A DEVICE FOR THAT PURPOSE

[76] Inventor: Evsey Isaakovich Yakubovich, 41 Belin Skogo St. Apt. #37, Nizhuy Novgorod, Russian Federation, 603115

[21] Appl. No.: 08/952,373
[22] PCT Filed: May 6, 1996
[86] PCT No.: PCT/RU96/00115
§ 371 Date: Nov. 17, 1997
§ 102(e) Date: Nov. 17, 1997
[87] PCT Pub. No.: WO96/36899
PCT Pub. Date: Nov. 21, 1996

[30] Foreign Application Priority Data

May 6, 1996 [RU] Russian Federation ............. 95108077

[51] Int. Cl.[7] .................................................. H04N 13/02
[52] U.S. Cl. .................................. 348/46; 348/49; 359/23
[58] Field of Search ................................. 348/40, 42, 46, 348/49, 60; 359/1, 9, 22, 23, 24, 30, 32, 34

[56] References Cited

U.S. PATENT DOCUMENTS

| | | | |
|---|---|---|---|
| 3,540,790 | 11/1970 | Rosen | 350/306 |
| 3,856,986 | 12/1974 | Macovski | 178/6.5 |
| 4,520,387 | 5/1985 | Cortellini | 358/90 |
| 4,598,973 | 7/1986 | Greenleaf | 350/306 |
| 4,654,699 | 3/1987 | Media | 358/88 |
| 4,719,160 | 1/1988 | Gerhart et al. | 430/2 |
| 5,291,321 | 3/1994 | Noh | 359/30 |
| 5,515,183 | 5/1996 | Hashimoto | 359/9 |

*Primary Examiner*—Bryan Tung
*Assistant Examiner*—Tung Vo
*Attorney, Agent, or Firm*—Gary Pisner

[57] ABSTRACT

A three-dimensional image is reproduced by unit 3. For that purpose, the interference pattern on carrier 8 is illuminated by source 7 of noncoherent reproduction radiation. The process is that of illuminating the first interference structure 5, which is optically coupled with the interference pattern, or the second interference structure 9, the principle of spatial filtration of which corresponds to the principle of spatial filtration of the first interference structure 5 and the scale of which corresponds to the scale of the interference structure illuminated. The beams are extracted the intensities, spatial positions and directions of which correspond to the intensities, spatial positions and directions of the beams that were registered in recording the interference pattern, i.e., the beams are extracted which correspond to the independent spatial coordinates $\alpha$ and $\beta$. The set of these beams corresponds to a three-dimensional image of object 4, which is indistinguishable from the real image.

9 Claims, 3 Drawing Sheets

METHOD OF FORMING AND REPRODUCING A THREE-DIMENSIONAL IMAGE AND A DEVICE FOR THAT PURPOSE

This invention is related to physical engineering, specifically, methods and devices for the formation and reproduction of a three-dimensional image in noncoherent light and is intended for use in photography, cinematography, and television.

There is a general method to form a stereoscopic image. The object is illuminated by image-formation radiation, and the radiation reflected from the object is recorded by a photosensitive cell in two perspectives corresponding to observation of the object through the right and left eyes.

To reproduce the image, special aids are used to allow each perspective to be observed separately through the right and left eyes. Such aids may include binoculars, color and polarization light filters, flash shutters, lens rasters, etc. This method is useful in photography, cinematography, and television. The shortcomings of this method are that a viewer cannot observe the parallax effect and has to stay immobile during observation N. F. Valyus, Raster Optical Instruments, Masliinostroyeniye, Moscow (1966), pp. 91–120).

Various devices are used to implement this method and improve, for example, the recording systems, viewing aids, etc., (see, e.g., U.S. Pat. No. 2,922,998 (1960) and U.S. Pat. No. 4,049,339 (1977)).

A method to form a three-dimensional photographic image of an object by using raster or lens-raster systems (the so-called 'integrated photography" method) is also known (see, e.g., Yu. A. Dudnikov and B. K. Rozhkov, Raster Systems for Stereoscopic Imaging [in Russian], Mashinostroyeniye, Leningrad (1986), pp. 102–172)). According to this technique, the object is illuminated by formation radiation having an arbitrary spectrum and the radiation reflected from the object is transmitted through a lens-raster screen, the micro lenses of which have a common focal plane, and the set of elementary images formed by those micro lenses is recorded by a photosensitive cell placed in that focal plane. In observation, the photographic image is illuminated by noncoherent radiation through the mentioned lens-raster screen and the recorded image is observed in transmitted light.

The device used for this method contains a source of formation radiation which is optically coupled with a three-dimensional image formation unit consisting of a lens-raster screen and a photosensitive cell. The three-dimensional image reproduction unit contains a lens-raster screen, a photographic image carrier, and a source of reproduction radiation, which are optically coupled with each other.

However, the difficulties in manufacturing a lens-raster system, the low resolution, and the "dead zones" due to lens rims which reduce the brightness of photographs impeded the introduction of this method and the device for its implementation into television and limited their use in photography.

A holographic method to form and reproduce a three-dimensional image of an object is also well known (see, e.g., Encyclopedia of Physics [in Russian], Sovetskaya entsiklopediya, Moscow (1988), vol. 1, pp.508 and 509). In accordance with this technique, the object is illuminated by monochromatic formation radiation and the interference pattern induced by the reference radiation, which is coherent with the formation radiation, and by the radiation reflected from the object is recorded at the photosensitive surface. The induced interference pattern is then illuminated by reference monochromatic radiation to observe a three-dimensional image. The holographic method is free of the drawbacks with the method of stereoscopic imaging and the lens-raster method.

The device for the holographic method contains a source of formation radiation represented by a laser and a three-dimensional image formation unit, which includes a photosensitive cell, and a source of reference radiation, which are optically coupled with each other. The three-dimensional image reproduction unit contains a source of reference radiation, which is also represented by a laser, and a carrier of the image of the interference pattern, which are optically coupled with each other (see ibid).

A drawback of this method and of the device for its implementation is the necessity of using a laser both in the formation and reproduction of a three-dimensional image. The formation of a three-dimensional image requires rigid (on the scale of the order of the light wavelength) spatial positioning of the laser, the object, the source of reference radiation and the photosensitive cell.

Various modifications of the holographic method and of the device for its implementation are known. For example, in the UK application No. 2,171,538, MPK GO3H 1/02 (1986) the design is presented according to which the reference radiation is formed by reflection from the mirror surface deposited on the photosensitive cell. This makes unnecessary to undertake special measures for rigid mutual positioning of the laser, the object, the source of reference radiation and the photosensitive cell; however, this does not exclude the necessity of using a laser to form and reproduce a holographic image.

The most analogous method to this invention is the well-known method of forming and reproducing a three-dimensional holographic image developed by Yu. N. Denisyuk (see, e.g., Encyclopedia of Physics [in Russian], Sovetskaya entsiklopediya, Moscow (1988), vol.,1, p. 509). Following this method to form a three-dimensional image, the object is illuminated by monochromatic formation radiation and reference radiation, which is coherent with the formation radiation, the interference pattern is induced and recorded, allowing the intensities, spatial positions and directions of tile beams from the source to be registered by a photosensitive cell. The interference pattern is recorded within the volume of a photosensitive cell the emulsion thickness of which is much greater than the spatial period of the interference pattern. To reproduce a three- dimensional image, the interference pattern is illuminated by reproduction radiation and the beams are extracted, the intensities, spatial positions and directions of which correspond to the intensities, spatial positions and directions of the beams registered in recording the interference pattern and the set of which corresponds to that three-dimensional image, the reproduction radiation being noncoherent.

The most analogous device to this invention is the device which implements the method described above (see ibid). The device to form and reproduce a three-dimensional image of an object contains a source of formation radiation (a laser), a three-dimensional image formation unit, and a three-dimensional image reproduction unit, which are optically coupled with each other. The three-dimensional image reproduction unit contains a source of reference radiation and a photosensitive cell, and the three-dimensional image reproduction unit comprises a source of reproduction radiation and a carrier of the image of the interference pattern, which are optically coupled with each other. A source of noncoherent radiation is used as the source of reproduction radiation. The advantage of the most analogous methods of forming and reproducing a three-dimensional image and of the device for its implementation is that they make it unnecessary to use a laser to reproduce a three-dimensional image.

However, these as well as other well-known designs of this kind are virtually unfit for the creation of three-dimensional television. In particular, the bandwidth of a holographic TV channel must exceed by several orders of magnitude the bandwidth of the existing TV channels, since the characteristic size of intensity inhomogeneities in the interference pattern recorded by a hologram is much smaller than the characteristic size of intensity inhomogeneities in the existing TV images. Moreover, great difficulties, still unsurmounted, impede the creation of media to record holograms for TV receivers (Thesaurus of Physics [in Russian], Sovetskaya entsiklopediya, Moscow (1983), p. 133), and the implementation of the above method and device requires use of a laser to form a three-dimensional image.

Thus, the problem to be resolved by the present invention is to develop a method of forming and reproducing a three-dimensional image and a device for its implementation which are suitable for use both in photography and television and make unnecessary the compulsory use of a laser both in the formation and reproduction of a three-dimensional image.

The essence of this invention is that in accordance with the developed method of forming and reproducing a three-dimensional image, like the method which is most analogous to it, when a three-dimensional image is formed the object is illuminated by formation radiation, the interference pattern is induced and recorded, the spatial positions and directions of the beams from the object are registered, and the beam intensities from the object are also registered by a photosensitive cell. To reproduce a three-dimensional image, the interference pattern is illuminated by reproduction radiation and the beams are extracted the intensities, spatial positions and directions of which correspond to the intensities, spatial positions and directions of the beams registered in recording the interference pattern and the set of which corresponds to that three-dimensional image.

New in this method is that when a three-dimensional image is formed spatial filtration of beams of different directions from the object is executed along two preset independent angular coordinates corresponding to those beam directions, using the first interference structure designed to allow interference to be performed with the amplitudes divided, thereby inducing the interference pattern mentioned above. The spatial positions and directions of the beams from the object are recorded jointly by the first interference structure and by a photosensitive cell. In reproduction of a three-dimensional image, when the interference pattern is illuminated by reproduction radiation, the first interference structure, which is optically coupled with the interference pattern, or the second interference structure, which is also designed to allow interference to be performed with the amplitudes divided, are illuminated. The principle of spatial filtration of the second interference structure corresponds to the principle of spatial filtration of the first interference structure, and the scale of the second interference structure corresponds to the scale of the illuminated interference structure.

In one particular case the formation radiation is noncoherent.

In another particular case the formation and reproduction radiations are both noncoherent.

The essence of this invention is also that the developed device for the formation and reproduction of a three-dimensional image of an object, like the device which is most analogous to it, contains a source of formation radiation and a unit for the formation of a three-dimensional image, and a unit for the reproduction of a three-dimensional image, which are optically coupled with each other. The three-dimensional image formation unit includes a photosensitive cell, and the three-dimensional image reproduction unit includes a source of noncoherent reproduction radiation and a carrier of the image of the interference pattern, which are optically coupled with each other.

New in the developed device is that the first interference structure, which is designed to allow interference to be performed with the amplitudes divided and is set in front of the photosensitive cell along the beam path, is added to the three-dimensional image formation unit. The second interference structure, which is also designed to allow interference to be performed with the amplitudes divided, is added to the three-dimensional image reproduction unit. The principle of spatial filtration of the second interference structure corresponds to the principle of spatial filtration of the first interference structure, and the scale of the second interference structure corresponds to the scale of the image carrier of the interference pattern. The second interference structure is optically coupled with the source of reproduction radiation and the image carrier of the interference pattern.

It is desirable to design the source of formation radiation as a noncoherent radiation source.

In the particular case where the source of formation radiation is designed as a noncoherent radiation source the three-dimensional image formation unit is designed as a pickup camera in which the lens is designed with a large-size aperture. The three-dimensional image reproduction unit is designed as a camera tube. The source of reproduction radiation is the screen of the camera tube, which also serves as a carrier of the image of the interference pattern, and the second interference structure is located between the camera tube and the viewer.

It is desirable to configure the first and second interference structures as including two optically coupled interference filters with the maximum bandwidths separated in space for the beams having different directions. The bandwidths of one interference filter are oriented in the localization plane of the interference pattern at angle a with respect to the bandwidths of the other interference filter, where $\pi > \alpha >$.

It is also desirable to design the interference filters so as to allow "lines of equal thickness" interference to be performed.

In a particular design, the first and second interference structures each include N thin films adjoining each other, where $N >= 2$, at least one thin film generating one interference filter has an optical thickness gradient which is different from the optical thickness gradient of at least one film generating another interference filter and the adjacent thin films have different refractive indices.

In this method, the spatial filtration of the beams passing in different directions from the object along two independent angular coordinates corresponding to those beam directions makes unnecessary the compulsory use of monochromatic (laser) radiation to form a three-dimensional image (although such a possibility is still admissible) and allows noncoherent radiation to be used for this purpose. Using the interference structure designed to allow interference to be performed with the amplitudes divided, the spatial filtration mentioned above can be executed by simple technical means. Also, in accordance with this method, the directions and spatial positions of the beams from the object are recorded jointly by the spatial structure and the photosensitive cell. This decreases considerably the requirements to the bandwidth for transmission of an interference pattern image through a TV channel in comparison with the requirements for transmission of a holographic image. Actually, it is required to merely expand the bandwidth of a standard TV channel by about a factor of 10, which is easily provided by the contemporary fiber-optical communication channels. In reproduction of a three-dimensional image, the extraction of the beams the set of which corresponds to that three-dimensional image requires use of the above-described interference structure in combination with the image carrier of the interference pattern, since the information on the directions and spatial positions of the beams from the object is contained in part in the principle of spatial filtration of the interference structure. The use of noncoherent radiation is also admissible.

In the device developed, the addition of the first interference structure mentioned above to the three-dimensional image formation unit allows spatial filtration of beams of different directions from the object to be performed along two preset independent angular coordinates corresponding to those directions. Obviously, the spatial filtration can be carried out both when the beams from the object are transmitted through the interference structure and when the above interference structure serves for reflection (the beams from the object are guided to the interference structure and the reflected beams are incident on the photosensitive cell). This allows, in recording the interference pattern, the intensities, spatial positions and directions of the beams from the object to be registered by using noncoherent radiation to form a three-dimensional image. The addition of the second interference structure, the principle of spatial filtration of which corresponds to the principle of spatial filtration of the first interference structure and the scale of which corresponds to the scale of the image carrier of the interference pattern, to the three-dimensional image reproduction unit ensures extraction of the beams the intensities, spatial positions and directions of which correspond to the intensities, spatial positions and directions of the beams registered in recording the interference pattern and the set of which corresponds to that three-dimensional image.

A standard pickup camera modified in accordance with this invention is used to introduce the method into television. The lens of the pickup camera features a large-size aperture, and the first interference structure, which includes two optically coupled interference filters, is set in front of the photosensitive cell along the beam path. A standard picture tube, to which the second interference structure is added and which is placed between the screen of picture tube and the viewer, is used to reproduce a three-dimensional image. The screen of the picture tube, which also serves as a carrier of the image of the interference pattern, is the source of reproduction radiation.

The use of the first and second interference structures in the form of two optically coupled interference filters designed to allow lines of equal thickness" interference to be executed, specifically, in the form of a thin-film multilayer structure, ensures high resolution (not less than 10 lies per 1 mm) and high image contrast (not worse than 100). Thus, the design developed ensures the achievement of the technical goal of using a radiation source with an arbitrary spectrum, in particular, a white light source, both to form and reproduce a three-dimensional image and does not require new environment to record the interference pattern. This helps reach the goals of this invention, since the proposed method and device for forming and reproducing a three-dimensional image can be used both in photography and in television even with standard means.

Figure 1:
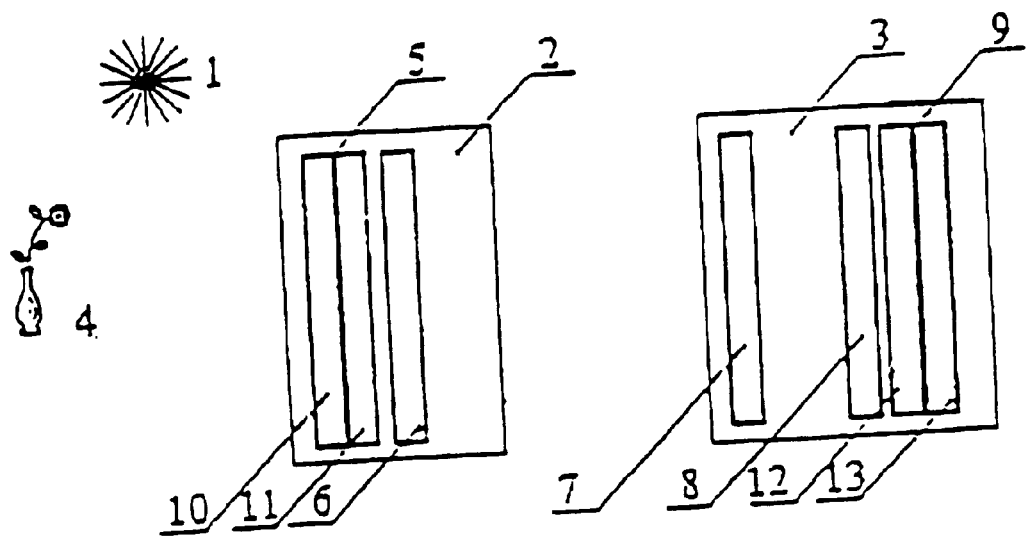
FIG. 1 is a schematic diagram of a version of the device to implement the method of forming and reproducing a three-dimensional image for the case where spatial filtration of the beams from the object is performed by passing the beams through the interference structure.

The device as shown in FIG. 1 contains a source 1 of formation radiation, a unit 2 for the formation of a three-dimensional image, and a unit 3 for the reproduction of a three-dimensional image, which are optically coupled with each other. An object 4 is placed along the optical path connecting source 1 and unit 2. Unit 2 includes the first interference structure 5 which is set in front of the photosensitive cell 6 along the beam path. Unit 3 includes a source 7 of reproduction radiation, a carrier 8 of the image of the interference pattern, and the second interference structure 9, which are optically coupled with each other.

Sources 1 and 7 are designed as noncoherent. For example, an incandescent lamp, a luminescent lamp, or natural light can be used for sources 1 and 7. For image reproduction, source 7 must have a diffuser to ensure the required beam intensities in different directions.

Interference structures 5 and 9 are designed to allow interference to be performed with the amplitudes divided, for example, in the form of two anisotropic crystals placed between crossed polarizers. A description of such an interference structure is given in RF patent publication No. 1,127,405. According to the present invention, interference structures 5 and 9 contain optically coupled interference filters 10 and 11 and 12 and 13.

The principle of spatial filtration of the interference structure 9 corresponds to the principle of spatial filtration of the interference structure 5. The scale of the interference structure 9 corresponds to the scale of the carrier 8.

The maximum bandwidths of the interference filters 10 and 11 and interference filters 12 and 13 are separated in space for the beams having different directions. The bandwidths of the interference filter 10 are oriented in the localization plane of the interference pattern at angle $\alpha$ with respect to the bandwidths of the interference filter 11, where $\pi > \alpha > 0$, and the bandwidths of the interference filter 12 are oriented in the localization plane of the interference pattern at angle $\theta$ with respect to the bandwidths of the interference filter 13, where $\pi > \theta > 0$. In the particular case this can be explained by the fact that interference filters 10, 11, 12, and 13 are designed to allow "lines of equal thickness" interference to be performed. In the particular design, interference structures 5 and 9 each include N thin films adjoining each other, where N>=2. Thin films 14 in interference filters 10 and 12 may have optical thickness gradients which differ from the optical thickness gradients of films 14 in interference filters 11 and 13. Thin films 14 adjoining each other may have refractive indices which do not coincide, for example, if they coated by thin films of a dielectric following the technology of manufacturing multilayer dielectric mirrors. The parameters required for interference filters 10, 11, 12, and 13 can be calculated, for example, in accordance with Theoretical Physics by F. A. Korolyov, Vysshaya Shkola, Moscow (1966), pp.404–452. Interference structures 5 and 9 can be made by way of deposition of thin films 14 on a transparent substrate made of glass, for example.

Photosensitive cell 6 is located in the plane of localization of the interference pattern, i.e., immediately behind the interference structure 5 along the beam path. A standard photosensitive plate or a photographic film can be used for photosensitive cell 6.

Carrier 8 of the image of the interference pattern is located immediately in front of the interference structure 9 along the beam path. Standard media such as photosensitive paper, a photosensitive plate, etc. can be used for photosensitive cell 6.

It is desirable to make thin films 14 in unit 2 come into contact with photosensitive cell 6 and to carrier 8 in unit 3. For this purpose, interference structures 5 and 9, for example, can be enclosed in mandrels fastened with photosensitive cell 6 and carrier 8, respectively (not shown).

Figure 2:
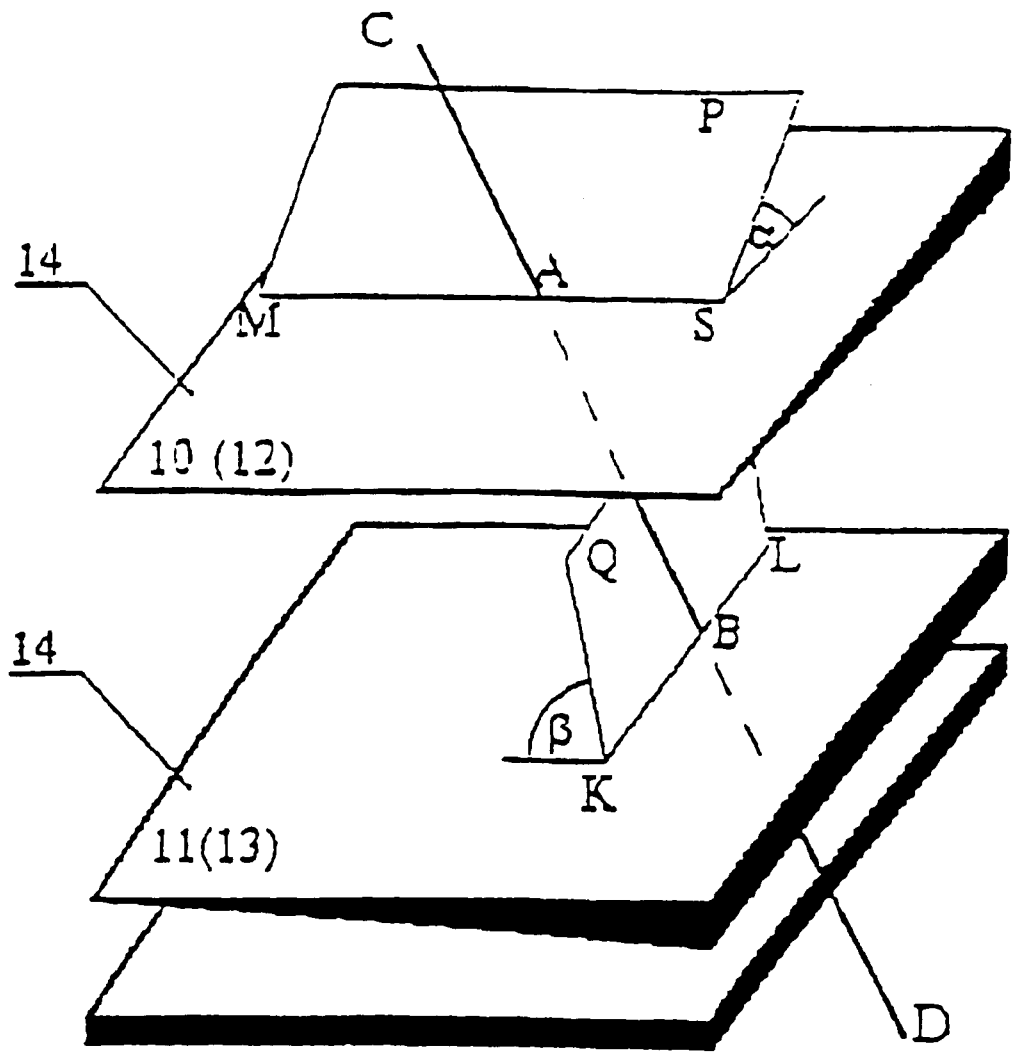
FIG. 2 illustrates the angular coordinate system to define beam directions.

FIG. 2 illustrates the case where the difference in the optical thickness gradients of thin films 14 that form interference filters 10 and 12 and 11 and 13 is ensured by the difference in the geometric thickness gradients of thin films 14. This condition can also be fulfilled if the refractive index gradients of thin films 14 that form interference filters 10 and 11 and 12 and 13 are different. Here, $\alpha$ is the angle between the surface of thin film 14 of interference filter 10(12) and plane P passing through the light beam CD and point A of incidence of that beam on line MS of equal thickness at the surface of thin film 14 of interference filter 10(12) and $\beta$ is the angle between the surface of thin film 14 of interference filter 11(13) and plane Q passing through the same light beam CD and point B of incidence of that beam on line KL of equal thickness at the surface of thin film 14 of interference filter 11(13).

Figure 3:
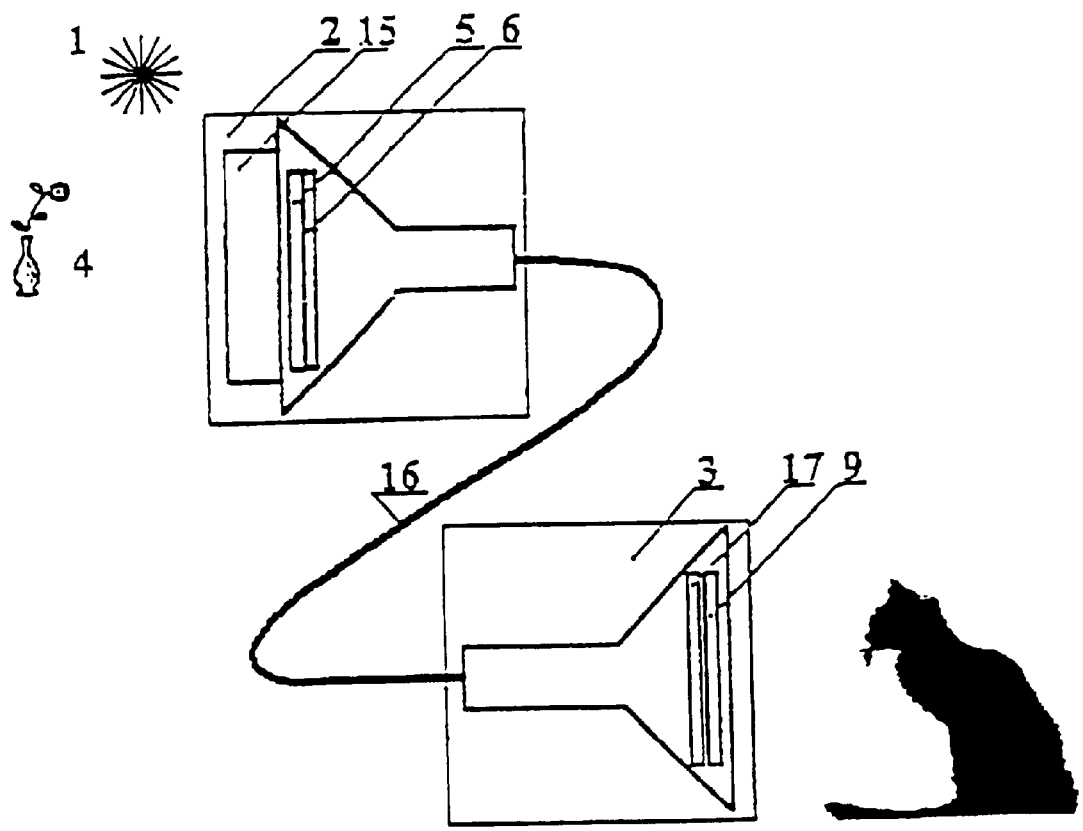
FIG. 3 is a schematic diagram of a version of the device to implement the method of forming and reproducing a three-dimensional image as applied to television.

The device as shown in FIG. 3 consists of a source 1 of formation radiation, a three-dimensional image formation unit 2, and a three-dimensional image reproduction unit 3, which are optically coupled with each other. Unit 2 is designed as a pickup camera in which the lens 15 features a large-size aperture (see, e.g., V. G. Komar and O. B. Serov, Art Holography and Holographic Cinematography [in Russian], Iskusstvo, Moscow (1987), pp.127 and 128). An object 4 is placed along the optical path connecting source 1 and unit 2. Unit 2 includes the first interference structure 5 which is placed before the photosensitive cell 6 along the beam path. Unit 2 is electrically coupled through communication channel 16 with unit 3. Unit 3 is configured as picture tube; screen 17 of the picture tube, which also serves as a carrier 8 of image of the interference pattern, is the source 7 of reproduction radiation. The second interference structure 9 is placed between screen 17 of the picture tube and viewer 18.

Interference structures 5 and 9 and interference filters 10 and 1I1 and 12 and 13 incorporated therein, respectively, are constructed in the same fashion as in the device shown in FIG. 1. The mandrel of interference structure 5 can be fastened to the side wall of the pickup camera, and the mandrel of interference structure 9 can be fastened to the side wall of the picture tube; thin films 14 must be snug against the phosphor (not shown).

This method of forming and reproducing a three-dimensional image by the device shown in FIG. 1 is implemented as follows.

A three-dimensional image is formed using unit 2. Specifically, object 4 is illuminated by source 1 of coherent formation radiation. Spatial filtration of the beams of different directions from object 4 is performed by the first interference structure 5 along two preset independent angular coordinates $\alpha$ and $\beta$ that correspond to those beam directions (FIG. 2). he radiation from object 4 first passes through interference filter 10 of interference structure 5; interference filter 10 carries out spatial filtration of the beams of different directions from object 4 along the preset angular coordinates $\alpha_1, \alpha_2, \alpha_3, \ldots$ that correspond to those beam directions. The radiation transmitted through interference filter 10 then passes through interference filter 1I1 which carries out spatial filtration of the radiation from object 4 along the preset angular coordinates $\beta_1, \beta_2, \beta_3, \ldots$ that correspond to the respective directions. The number of preset angular coordinates $\alpha$ and $\beta$ characterizes the number of preset perspectives of object 4. The particular values of the angular coordinates $\alpha_1, \alpha_2, \alpha_3, \ldots$ and $\beta_1, \beta_2, \beta_3, \ldots$ are determined by the condition of comfortable observation (see, e.g., Yu. A. Dudnikov and B. K. Rozhkov, Raster Systems for Stereoscopic Imaging [in Russian], Mashinostroyeniye, Leningrad (1986), pp.114 and 115). Since the optical thickness gradient of the thin films entering filter 11 is orthogonal to the optical thickness gradient of the thin films entering filter 11, as the result of the effect of interference filters 10 and 11, the interference pattern will be composed of points, the position and frequency of which are determined by the optical flow direction (angular coordinates $\alpha_1, \alpha_2, \alpha_3, \ldots$ and $\beta_1, \beta_2, \beta_3, \ldots$), in its localization plane. The interference pattern is as if granular. Light flows with considerably different directions give considerably different systems of points in the representative plane. The interference pattern formed in such a fashion is recorded by photosensitive cell 6. In recording the interference pattern, the beam intensities from object 4 are recorded using photosensitive cell 6, and the directions and spatial positions of the beams from object 4 are recorded jointly by spatial structure 5 and photosensitive cell 6.

Photosensitive cell 6 after recording the image of the interference pattern can serve as arrier 8, for example, in photography. If necessary, the image of the interference pattern can be eproduced to another carrier, for example in television.

What is claimed is:

1. A method forming and reproducing a three-dimensional image of an object, wherein to form a three-dimensional image, the object is illuminated by formation radiation an interference pattern is formed and recorded, the spatial positions and directions of beams from the object are registered, and the beam intensities from the object are registered by a photosensitive cell, and wherein to reproduce a three-dimensional image, the interference pattern is illuminated by reproduction radiation and the beams are extracted, the intensities, spatial positions, and directions of which correspond to the intensities, spatial positions, and directions of the beams registered in recording the interference pattern and the set of which corresponds to the three-dimensional image, differing in that:

to form a three-dimensional image, spatial filtration of the beams of different directions from the object is carried out along two preset independent angular coordinated corresponding to those directions, using the first interference structure designed to allow interference to be performed with the amplitudes divided, thereby forming the interference pattern;

the spatial positions and directions of the beams from the object are registered jointly by the first interference structure and the photosensitive cell; and to reproduce a three-dimensional image, when the interference pattern is illuminated by reproduction radiation, illuminating the first interference structure or a second interference structure, which is designed to allow interference to be performed with the amplitudes divided, wherein the first and second interference structures are optically coupled to the interference pattern;

wherein a principle of spatial filtration of the second interference structure corresponds to a principle of spatial filtration of the first interference structure, and a scale of the second interference structure corresponds to a scale of the illuminated interference pattern.

2. The method as claimed in claim 1, differing in that the formation radiation is non-coherent.

3. The method as claimed in claim 1, differing in that the reproduction radiation is non-coherent.

4. A device for forming and reproducing a three-dimensional image of an object, the device containing a source of formation radiation optically coupled to a unit for forming a three-dimensional image and a unit for reproducing a three-dimensional image, wherein the three-dimensional image formation unit contains a photosensitive cell and the three-dimensional image reproduction unit contains a source of noncoherent reproduction radiation optically coupled to an image carrier of an interference pattern, differing in that:

a first interference structure, which is designed to allow interference to be performed with amplitudes divided and which is set in front of the photosensitive cell along the team path, is added to the three-dimensional image formation unit; and a second interference structure, which is designed to allow interference to be performed with amplitudes divided, is added to the three-dimensional image reproduction unit;

wherein a principle of spatial filtration of the second interference structure corresponds to a principle of spatial filtration of the first interference structure, and a scale of the second interference structure corresponds to a scale of the image carrier of the interference pattern; and wherein the second interference structure is optically coupled with the source of reproduction radiation and the image carrier of the interference pattern.

5. The device as claimed in claim 4, differing in that the formation radiation source is designed as a non-coherent radiation source.

6. The device as claimed in claim 5, differing in that wherein the three-dimensional image formation unit is designed as a pickup camera in which the lens features having a large-size aperture; wherein the three-dimensional image reproduction unit is designed as a picture tube; and wherein the source of reproduction radiation is the screen of the picture tube which also serves as an image carrier of the interference pattern and the second interference pattern is placed between the screen of the picture tube and the viewer.

7. The device as claimed in claim 4, or in claim 5, or in claim 6, differing in that the first and second interference structures each includes two optically coupled interference filters with the maximum bandwidths separated in space for the beams having different directions, wherein the bandwidths of one interference filter are oriented in the localization plane of the interference pattern at an angle with respect to the bandwidths of the other interference filter, where $>>0$.

8. The device as claimed in claim 7, differing in that the interference filters are designed to allow lines of equal thickness interference to be performed.

9. The device as claimed in claim 8, differing in that the first and second interference structures each includes N thin films adjoining each other, where $N>2$, wherein at least one thin film forming one interference filter has an optical thickness gradient different from the optical thickness gradient of at least one film forming the other interference filter and the adjacent thin films have equal refractive indices.

* * * * *